United States Patent [19]

Dahanayake

[11] Patent Number: 5,045,232

[45] Date of Patent: Sep. 3, 1991

[54] LOW VISCOSITY DEFOAMING/ANTIFORMING FORMULATIONS

[75] Inventor: Manilal S. Dahanayake, Wayne, N.J.

[73] Assignee: Rhone-Poulenc Specialty Chemicals, L.P., Princeton, N.J.

[21] Appl. No.: 379,304

[22] Filed: Jul. 12, 1989

[51] Int. Cl.$^5$ .................................. B01D 19/04
[52] U.S. Cl. .................. 252/321; 252/358; 568/606
[58] Field of Search .............. 252/321, 358; 568/593, 568/602, 606, 619

[56] References Cited

U.S. PATENT DOCUMENTS

| | | | |
|---|---|---|---|
| 3,078,236 | 2/1963 | Hwa | 252/321 |
| 3,959,176 | 5/1976 | Mahn et al. | 252/358 X |
| 4,306,987 | 12/1981 | Kaneko | 252/321 X |
| 4,344,863 | 8/1982 | Robbins et al. | 252/358 X |
| 4,411,810 | 10/1983 | Dutton et al. | 252/DIG. 1 X |
| 4,510,067 | 4/1985 | Ozmeral | 252/358 X |
| 4,726,909 | 2/1988 | Otten et al. | 252/DIG. 1 X |
| 4,745,230 | 5/1988 | Otten et al. | 252/DIG. 1 X |

FOREIGN PATENT DOCUMENTS

| | | | |
|---|---|---|---|
| 724623 | 12/1965 | Canada | 252/358 |
| 1143244 | 3/1983 | Canada | 252/358 |
| 53-134785 | 11/1978 | Japan | 252/358 |
| 60-007909A | 1/1985 | Japan | 252/358 |
| 63-232808A | 9/1988 | Japan | 252/358 |

*Primary Examiner*—Richard D. Lovering
*Assistant Examiner*—Daniel S. Metzmaier
*Attorney, Agent, or Firm*—Walter Katz; Paul J. Juettner

[57] ABSTRACT

The present invention relates to balanced liquid hydrophobic/hydrophilic liquid formulations comprising:
(a) between about 10 and about 90% by weight of a block polymer having the formula

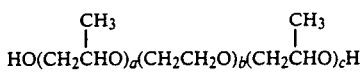

or

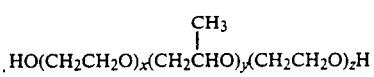

or mixtures thereof;
(b) between about 10 and about 90% by weight of trimethylol propane initiated polyalkylene oxide having the formula

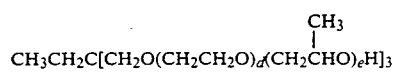

optionally in admixture with polypropylene glycol having the formula

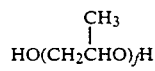

(c) between about 10 and about 90% by weight of an alcohol alkoxylate having the formula

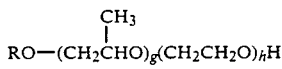

or

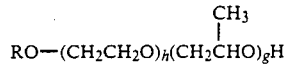

to provide a 100% composition and
(d) between about 0.1 and about 10% by weight hydrophobic silica based on components (a)+(b)+(c). The invention also pertains to the use of the above mixture in foamed liquids or liquid susceptible to foaming.

14 Claims, No Drawings

LOW VISCOSITY DEFOAMING/ANTIFORMING FORMULATIONS

PRIOR ART

The polypropylene glycols and polyoxyethylene-polyoxypropylene copolymers which have been employed individually as antifoaming agents have several drawbacks. Primarily, they have limited water solubility and dispersibility so that large amounts of these antifoamers must be employed and, even then, the defoaming action is relatively low. Generally, a foam head of less than 2 cm on a 60 square cm surface area is the upper limit of tolerance for commercial defoaming applications and for certain uses not more than 0.3 cm is required. Secondly, formulations containing these compounds are somewhat viscous which presents pumping difficulties in antifoaming processing. Several solid non-foaming dispersing formulations have also been proposed as in U.S. Pat. No. 3,959,176; however these present problems of dispersibility and cannot be pumped into foamable solutions.

Accordingly, it is an object of this invention to overcome the above deficiencies of the prior art and to provide a particularly effective antifoaming/defoaming mixture which is economically prepared.

Another object of this invention is to provide a liquid mixture which is capable of defoaming an aqueous system at a greatly increased rate.

Another object is to provide a liquid antifoaming-/defoaming composition having significantly reduced viscosity which can be most economically incorporated into a foamable liquid or added to a foam.

Still another object is to prepare a composition which, in addition to its antifoaming and defoaming properties, provides antiswelling to various polymers when in contact therewith.

These and other objects of the invention will become apparent from the following description and disclosure.

THE INVENTION

In accordance with this invention there is provided a liquid antifoaming/defoaming mixture or blend of components having a cloud point less than 35 and comprising:

(a) between about 10 and about 90% by weight of a block polymer having the formula $$HO(CH_2\overset{CH_3}{\underset{|}{C}}HO)_a(CH_2CH_2O)_b(CH_2\overset{CH_3}{\underset{|}{C}}HO)_cH$$

or $$HO(CH_2CH_2O)_x(CH_2\overset{CH_3}{\underset{|}{C}}HO)_y(CH_2CH_2O)_zH$$

or mixtures thereof;

(b) between about 10 and about 90% by weight of trimethylol propane initiated polypropylene oxide having the formula

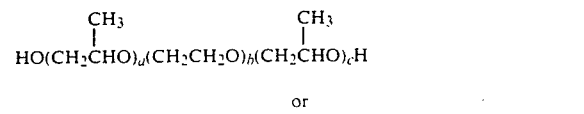

optionally in admixture with polypropylene glycol having the formula

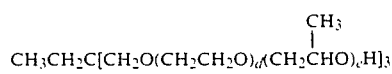

(c) between about 10 and about 90% of an alcohol alkoxylate having the formula

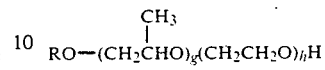

or

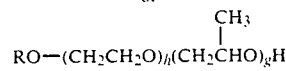

to provide a 100% composition and (d) between about 0.1 and about 10% by weight hydrophobic silica based on components (a) +(b) +(c) wherein R is linear or branched chain alkyl having from 4 to 23 carbon atoms or a mixture thereof and the lettered subscripts have the following values:

the sum of a +c = 10 to 150, preferably 20 to 70
b = 2 to 100, preferably 4 to 30
d = 0 to 100, preferably 0 to 50
e = 20 to 150, preferably 30 to 100
f = 15 to 200, preferably 25 to 100
g = 1 to 20, preferably 4 to 15
h = 0 to 15, preferably 0 to 10
the sum x +z = 2 to 50, preferably 4 to 15
y = 30 to 100, preferably 40 to 80

In the above, component (a) subscripts a, b and c as well as subscripts x, y and z, are integers having a value greater than one and describe a copolymer having a number average molecular weight of from about 675 to about 15,000, preferably from about 1000 to about 10,000. The units defined by (g) and (h) occur in random distribution in the copolymer.

The cloud point of instant mixtures can vary, from about 1 to about 35; although a cloud point of from about 1 to 25 is most beneficial.

Preferred blends of the present composition are those wherein the weight ratio of component (a) to component b) to component (c) are present in a weight ratio range of 0.3–3:1–6:0.3–2. Most preferred are those having a weight ratio of (a) to (b) between about 5:1 and 1:5, and those blends wherein propylene oxide units, with respect to ethylene oxide units, predominate in the overall composition.

The hydrophobic silica is preferably employed at concentrations between about 0.1 and about 10% by weight, most desirably, when a liquid mixture having a viscosity of not more than 500 centipoises (cps) is required, the concentration of the silica is not greater than 5% by weight. Although the viscosity of the liquid mixture can vary between about 100 and about 3,000 cps, depending upon its intended use, viscosities in the lower portion of this range, e.g. less than 550 cps, are usually desired for processing purposes. While increased hydrophobic silica content materially raises the viscosity, such increased amounts do not provide any antifoaming benefit. Accordingly, the amount of hydrophobic silica above 10% by weight is not desirable.

The hydrophobic silica component of the composition, as known in the art, is prepared from hydrophilic silica which is treated to render the silica hydrophobic. One suitable method for rendering the silica hydrophobic is to permanently affix a liquid hydrophobic polysiloxane oil onto the silica particles. Since hydrophobic silica is well known in the art, no detailed description thereof is deemed necessary for a complete understanding of the present invention. The preparation of hydrophobic silica is described in U.S. Pat. Nos. 3,207,698; 3,408,306; and 3,076,768, as well as the refeences referred to in such patents, all of which are hereby incorporated by reference. A preferred silica is a precipitated silica, such as the precipitated silica sold as QUSO-G30 or QUSO WR-83.

The above blend of components provides a hydrophobic/hydrophilic balance which allows faster diffusion of the antifoamer composition into the liquid/air interface and rapidly transports silica to the interface where a small amount efficiently performs defoaming action. The components of the above mixture also interact to effect destructurization of the monomolecular foamed layer by increasing the free energy of interaction between the foam forming molecules which leads to liberation of air and collapse of bubbles. Because of the hydrophobic/hydrophilic balance in the above formulation, the present composition has greater affinity for, and faster action in, aqueous systems which are subject to foaming. The present blend is capable of reducing the foam head of a foamed liquid by more than 70% upon contact and in less than 1.5 minutes completely destroys the foam.

In addition to its defoaming and antifoaming functions, the present composition provides antiswelling properties to certain polymers, including polyvinyl halides, polypropylenes, polyethylenes, polytetrafluoroethylenes, polychlorotrifluoroethylenes and the like.

Examples of foamed solutions to which the present composition is applied, include the alkali and alkaline earth metal salts, as well as ammonium salts, of alkyl benzene sulfonates and lauryl sulfates, lauryl ether sulfates, alkoxylated alkyl phenols, urethane polymers, phosphate ester surfactants, salts of fatty acids employed in the paper making industry and photopolymers, such as methacrylic alkyl esters and their carboxylic salts, employed for printed board circuits in the electronic industry. The present blends are useful as defoamers or antifoamers for laundry detergents, dishwashing formulations, paper making processes, metal working processes and many others.

To effect defoaming or antifoaming only a small amount of the blend is needed to provide the desired result. Generally between about 0.001% and about 3% by weight, preferably between about 0.05% and about 0.5% by weight of the present blend, based on foamed or foamable liquid, is employed to defoam on contact. The present mixture is economically and conveniently prepared by merely mixing components (a), (b) and (c) in any order at a temperature between about 10° C. and about 100° C. under atmospheric conditions for a period of up to 3 hours depending upon the volume and mixing equipment employed. Generally, the formulation is prepared within a 1 hour mixing period at ambient temperature. The resulting mixture is preferably used in undiluted condition; although in certain cases where desired, it can be diluted to a desired concentration with an inert solvent such as water, PEG, PPG, benzene, heptane, hydrocarbons and the like before contact with a foamed layer or before admixture with a foamable liquid prior to agitation. The defoaming or antifoaming operations are carried out under the same conditions of temperature and pressure described above using conventional foam breaking or liquid mixing techniques.

Having generally described the invention, reference is now had to the accompanying examples which include preferred embodiments. These examples are not to be construed as limiting to the scope of the present antifoaming/defoaming and anti-swelling compositions which are more broadly set forth above and in the appended claims.

EXAMPLE 1

The following composition A was mixed for 5 minutes at ambient temperature under atmospheric conditions in a 200 ml glass beaker.

(a) 24.0 g. of polyoxyethylene-polyoxypropylene block polymer containing 10% EO and 90% PO in the structure

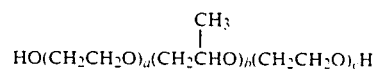

(PEGOL-L101).

(b) 50.0 g. of trimethylol propane propoxylate (40 moles PO).

(c) 25 g. of polyethoxylated (5 moles) polypropoxylated (7 moles) $C_{12}$ to $C_{14}$ alkanol mixture and (d) 1.0 g. of hydrophobic silica (QUSO WR-83)

The above mixture had a viscosity of 200 ops.

The antifoaming property of the above composition was tested as follows. As a control, 200 g. of 0.1% anionic dodecyl benzene sulfonate in water was stirred at ambient temperature in a glass measuring column for 1 minute at 1000 rpm and developed a foam head of 10 cm. Stirring was then discontinued and the liquid left to stand for 1 minute. The foam head was unchanged after 1 minute standing time. The above procedure was repeated except that 0.1% of the above liquid composition was added to the sulfonate before stirring. After stirring this mixture for 1 minute, only 1.5 cm of foam head developed and after 1 minute standing time, the sulfonate was completely defoamed.

EXAMPLE 2

Example 1 was repeated except that polyethoxylated (9 moles) nonyl phenol was substituted as the foamable liquid.

The antifoaming test results were as follows:

| | cm |
|---|---|
| Initial foam head developed in the absence of Composition A/foam head after 1 minute | 3.5/3.2 |
| Initial foam head developed in liquid incorporating 0.1% of Compositon A/Foam head after 1 minute | 0.3/0.0 |

EXAMPLE 3

Example 1 was repeated except that the homopolymer of methacrylic acid methyl ester (RISTON) in 0.85% $Na_2CO_3$ was used as the foamable liquid solution and the results of the antifoaming test were as follows.

| | cm |
|---|---|
| Initial foam head developed in the absence of Composition B/foam head after 1 minute | 3.1/2.8 |

-continued

| | cm |
|---|---|
| Initial foam head developed in liquid incorporating 0.1% of Composition B/Foam head after 1 minute | 0.1/0.1 |

EXAMPLE 4

Composition B containing the following components was substituted in Example 1 and was prepared by mixing for 5 minutes at ambient temperature under atmospheric conditions in a 200 ml glass beaker.
  (a) 24.0 g. of polyoxyethylene-polyoxypropylene block copolymer having the polyoxypropylene capping blocks and containing 10% polyoxyethylene and 90% polyoxypropylene to provide a copolymer having a molecular weight of 2,800 (PEGOL 25 R1).
  (b) 50.0 g. of trimethylol propane propoxylate (40 moles of polyoxypropylene).
  (c) 25.0 g. of a polyethoxylated (5 moles)—polypropoxylated (7 moles) $C_{12}$ to $C_{14}$ mixed linear alcohol.
  (d) 1.0 g. of hydrophobic silica (Quso WR-83).

The above mixture had a viscosity of 325 cps.

The antifoaming property of the above composition was tested as follows. As a control, 200 g. of 0.1% anionic dodecyl benzene sulfonate in water was stirred at ambient temperature in a glass measuring column for 1 minute at 1000 rpm and developed a foam head of 10 cm. Stirring was then discontinued and the liquid left to stand for 1 minute. The foam head was unchanged after 1 minute standing time. The above procedure was repeated except that 0.1% of the above liquid composition was added to the sulfonate solution before stirring. After stirring this mixture for 1 minute, only 1.2 cm of foam head developed and after 1 minute standing time, the sulfonate was completely defoamed.

EXAMPLE 5

Composition C containing the following components was substituted in Example 1 and was prepared by mixing for 5 minutes at ambient temperature under atmospheric conditions in a 200 ml glass beaker.
  (a) 24.0 g. of a 20% polyoxyethylene—80% polyoxypropylene block copolymer having polyoxypropylene capping blocks and having a molecular weight of 3,125 (PEGOL 25 R2).
  (b) 50.0 g. of trimethylol propane propoxylate (45 moles of polyoxypropylene).
  (c) 25.0 g. of a polyethoxylated (5 moles)—polypropoxylated (7 moles) $C_{12}$ to $C_{14}$ mixed linear alcohol.
  (d) 1.0 g. of hydrophobic silica (QUSO WR-83).

The results of the antifoaming test were as follows

| | cm |
|---|---|
| Initial foam head developed in absence of Composition C/foam head after 1 minute | 10.2/10.0 |
| Initial foam head developed in mixture containing 0.1% of Composition C/foam head after 1 minute | 1.8/0.8 |

When the hydrophobic silica was increased above 10% e.g. 12% the viscosity of the mixture increased to 2000 cps which made pumping of the liquid composition difficult and led to deposits on the equipment. Also, dispersibility in the foamable liquid solution of dodecyl benzene sulfonate was markedly reduced.

EXAMPLE 6

Example 5 was repeated except that polyoxypropylene (9 moles) nonylphenol was substituted as the foamable liquid. The results were as follows.

| | cm |
|---|---|
| Initial foam head of the polyalkoxylated nonyl phenol in the absence of the antifoaming composition C/foam head after 1 minute | 3.5/3.2 |
| Initial foam head of the foamable/liquid after incorporation of Composition C/foam head after 1 minute | 1.2/0.6 |

COMPARATIVE EXAMPLE 7

The following composition D was mixed for 5 minutes at ambient temperature under atmospheric conditions in a 200 ml glass beaker.
  (a) 24.0 g. of polyoxyethylene-polyoxypropylene block copolymer having polyoxypropylene capping blocks and containing 80% of polyoxyethylene.
  (b) 50.0 g. of trimethylol propane propoxylate (15 moles of polypropylene oxide).
  (c) 25 g. of polyethoxylated (5 moles) polypropoxylated (5 moles) $C_{12}$ to $C_{14}$ alchols and
  (d) 1.0 g. of hydrophobic silica (QUSO WR-83)

The above mixture had a viscosity of about 600 cps.

The antifoaming property of the above composition was tested as follows. As a control, 200 g. of 0.1% anionic dodecyl benzene sulfonate in water was stirred at ambient temperature in a glass measuring column for 1 minute at 1000 rpm and developed a foam head of 10 cm. Stirring was then discontinued and the liquid left to stand for 1 minute. The foam head was unchanged after 1 minute standing time. The above procedure was repeated except that 0.1% of the above liquid composition was added to the sulfonate before stirring. After stirring this mixture for 1 minute, 4.5 cm of foam head developed and after 1 minute standing time, the sulfonate solution was defoamed, only to 3.5 cms.

The above example illustrates the affect of excess moles of EO as opposed to PO concentration in the composition.

What is claimed is:

1. A defoaming/antifoaming liquid composition consisting essentially of
  (a) greater than 10 and less than 90% by weight of the composition of a block polymer having the formula

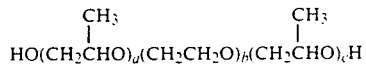

or

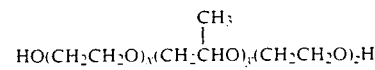

or mixtures thereof;
  (b) greater than 10 and less than 90% by weight of trimethylol propane initiated polypropylene oxide having the formula

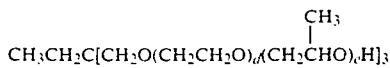

optionally in admixture with polypropylene glycol having the formula

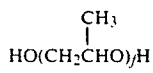

(c) greater than 10 to less than 90% by weight of an alcohol alkoxylate heteric copolymer having the formula

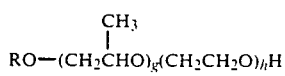

or

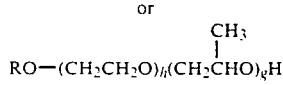

wherein R is linear or branched chain alkyl having from 4 to 22 carbon atoms or a mixture thereof, and (d) between about 0.1 and about 5% by weight hydrophobic silica based on components (a) +(b) +(c), and the lettered subscripts having the following values:

| | |
|---|---|
| the sum of a + c = | 20 to 70. |
| b = | 4 to 30. |
| d = | 0 to 50. |
| e = | 30 to 100. |
| f = | 25 to 100. |
| g = | 4 to 15. |
| h = | 0 to 10. |
| the sum x + z = | 4 to 15. |
| y = | 40 to 80. | with the proviso that the propylene oxide units, with respect to ethylene oxide units, predominate in the overall composition, and wherein the composition has a viscosity of between about 100 and about 500 cps.

2. The composition of claim 1 wherein the subscripts a, b and c and also x, y and z are integers having a value greater than 1 and the number average molecular weight of component (a) is between about 675 and about 15,000 and wherein polyoxypropylene units of a +c comprise from about 60% to about 90% by weight of the copolymer and wherein the polyoxyethylene units of x +z comprise from about 10% to about 30% by weight of the copolymer.

3. The composition of claim 1 wherein the weight ratio of component (a) to component (b) to component (c) is in the range of 0.3–2:1–6:0.3–2.

4. The composition of claim 3 wherein the weight ratio of component (a) to component (b) is between about 5:1 and about 1:5.

5. The composition of claim 1 wherein (a) is about 24%, (b) is about 50% and (c) is about 25%, by weight, of the composition.

6. The composition of claim 1 wherein component (a) has the formula

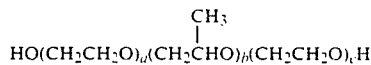

where a +c comprises 10% of the alkylene oxide content.

7. The composition of claim 1 wherein component (a) has the formula

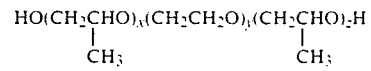

where y is 10% of the alkylene oxide content.

8. The composition of claim 1 wherein component (a) has the formula

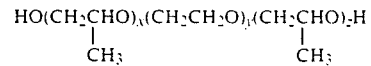

where y is 20% of the alkylene oxide content.

9. The process of adding an effective antifoaming-/defoaming amount of the composition of claim 1 to a liquid subject to foaming.

10. The process of claim 9 wherein between about 0.001% and about 3% by weight of the composition is added to said foamable liquid.

11. The process of adding an effective defoaming amount of the composition of claim 1 to the air/liquid interface of a foamed liquid.

12. The process of claim 11 wherein between about 0.001% and about 3% by weight of the composition is added to the foamed liquid.

13. A foamable liquid containing from about 0.001% and about 3% by weight of the mixture of claim 1.

14. The foamable liquid of claim 13 containing from about 0.005% to about 0.5% by weight of said mixture.

* * * * *